Feb. 27, 1973  G. C. WILLEMS ET AL  3,718,293
DYNAMIC LEAD GUIDANCE SYSTEM FOR HOMING NAVIGATION
Filed Jan. 4, 1971  2 Sheets-Sheet 1

Gilbert C. Willems
Ray H. Farmer,
INVENTORS.

BY Harry M. Saragovitz
Edward J. Kelly
Herbert Berl
Harold W. Hilton

# United States Patent Office 3,718,293
Patented Feb. 27, 1973

3,718,293
DYNAMIC LEAD GUIDANCE SYSTEM FOR HOMING NAVIGATION
Gilbert C. Willems, Madison, and Ray H. Farmer, Huntsville, Ala., assignors to the United States of America as represented by the Secretary of the Army
Filed Jan. 4, 1971, Ser. No. 103,411
Int. Cl. F42f *15/02;* F41g *7/00, 9/00*
U.S. Cl. 244—3.16    2 Claims

ABSTRACT OF THE DISCLOSURE

A system and method of guiding homing missiles toward low maneuverability targets. Dynamic lead navigation is implemented with a body fixed detector and a two-degree-of-freedom position gyroscope. The position gyro can be a part of the normal missile autopilot and need not represent an additional instrument. In flight toward a target, a target seeker, which yields a proportional output, measures the angle between the missile-target line-of-sight and the missile center line. An instrument gyro allows an attitude angle to be measured. The difference between these two angles is obtained, providing the missile-target look-angle or error signal for directing the missile toward the target.

BACKGROUND OF THE INVENTION

Proportional navigation within a missile affords a technique wherein the missile angular turning rate is forced to be proportional by an amount N (N being the navigation ratio and usually being between 3 and 5) to the angular rate of the missile-target line-of-sight (LOS). This requires that the LOS rate be measured. Generally, this measurement is accomplished by using a gimballed seeker mounted on the nose of the missile to track the target. A measurement of the LOS rate is obtained by monitoring the average output torque supplied to the gimbal torqueing devices. The gimballed seeker requires a two-degree-of-freedom gimbal, two independent servo loops, and must be inertially stabilized by either position or rate gyros. The cost of providing a gimballed seeker is often a large part of the total cost of a missile. The typical target seeker finds its target by following heat, light or other emissions from the target. These target emissions, received by the seeker, result in an output being developed which indicates any error correcting signal that may be necessary between the direction of missile flight and the LOS between the missile seeker and the target.

SUMMARY OF THE INVENTION

Dynamic lead guidance affords a system of terminal guidance for homing missiles that is simpler and more economical than conventional methods such as proportional navigation, and which provides accurate terminal guidance when employed against low maneuverability targets. In dynamic lead navigation the missile turning rate is equal to the line-of-sight rate under steady state conditions. However, during transient conditions the gain changes from unity to a larger value providing dynamic lead guidance. With a missile in flight toward a target, a target seeker measures the angle between the missile-target line-of-sight and the missile longitudinal center line. An instrument gyro allows the attitude angle of the missile to be measured. The difference between these two angles provides the missile-target error signal for directing the missile toward the target, while maintaining the missile turning rate proportional to the LOS rate.

An object of the present invention is to provide a simple, economical navigation means for accurate terminal guidance to low maneuverability or land based targets.

Another object of the present invention is to provide a navigation system using a simple, body fixed seeker and position gyro to yield missile guidance angle measurements for terminal guidance.

DESCRIPTION OF THE PREFERRED EMBODIMENT

Figure 1:
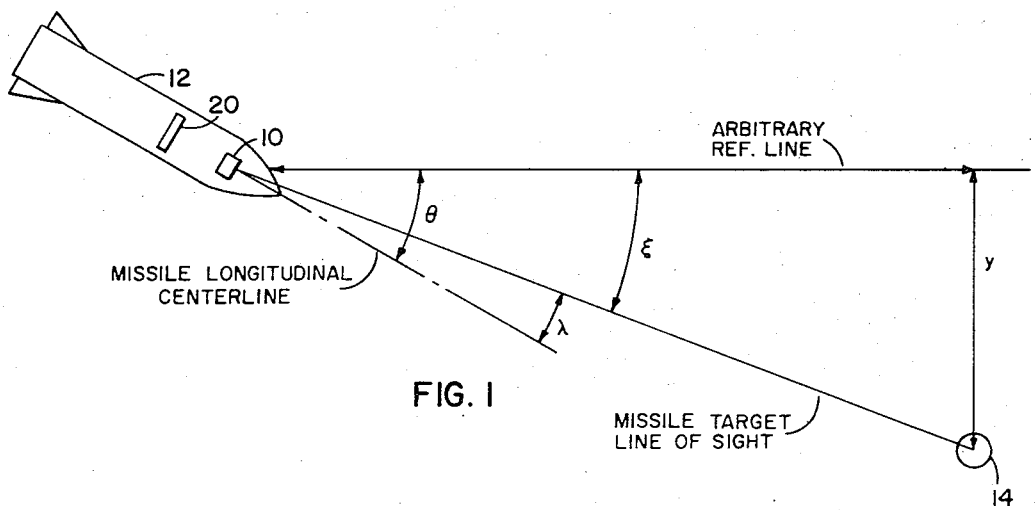
FIG. 1 is a diagrammatic representation of a missile in which the present invention is contained.

In dynamic lead navigation the missile turning rate is equal to the line-of-sight (LOS) rate between the missile and its target under steady state or static conditions. However, during noisy or transient conditions the gain changes from unity to a larger value, providing dynamic lead. Dynamic lead guidance requires only a body fixed detector (seeker) and a two-degree-of-freedom gyro, which is simpler than proportional navigation. The position gyro can be shared with usual autopilot functions, and is therefore not necessarily an added instrument. As shown in FIG. 1, a body fixed seeker 10 is placed in a missile 12 so that its null corresponds to the missile center line. Thus, within the linear region of the seeker 10, the seeker measures an angle $\lambda$ between the LOS to a target 14 and the missile longitudinal center line. An instrument gyro 20 (free gyro with position pick-offs in both gimbals) with the spin axis aligned along the missile longitudinal axis, allows an attitude angle $\theta$ to be measured in either pitch or yaw. A rate gyro or rate integrating gyro can also be used for measuring the angle $\theta$. Thus, a measurement of both $\lambda$ and $\theta$ are obtained. The difference between these angles is defined as the missile-target look-angle $\xi$, where $(\theta - \lambda) = \xi$. Hence, only two measurements and the difference between them are needed to implement dynamic lead guidance.

Figure 2:
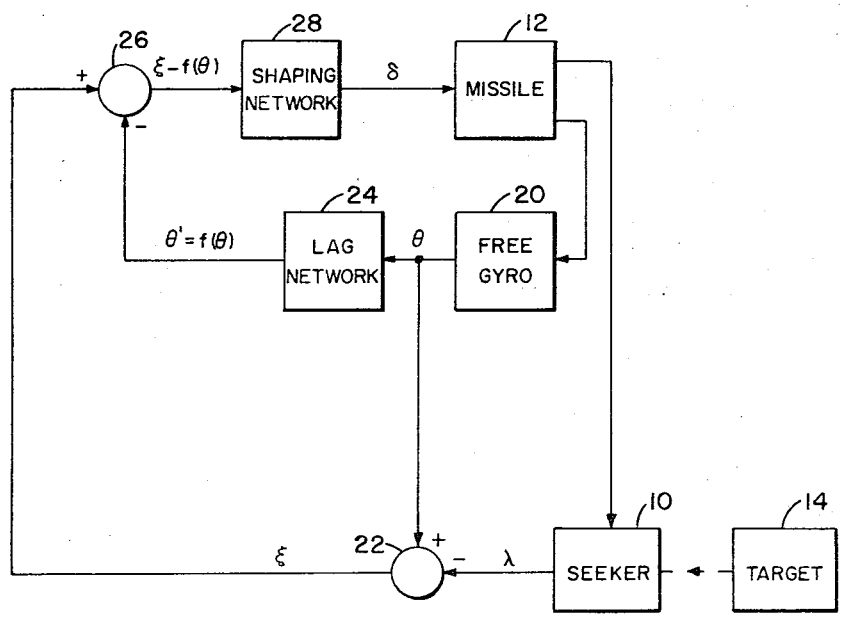
FIG. 2 is a block diagram showing a preferred form of the invention.

As further shown in FIG. 2, a signal from target 14 is received by seeker 10. Seeker 10, being fixed with respect to the missile longitudinal center line, generates the difference angle $\lambda$, the angle being between the missile center line and the missile-target LOS. Instrument gyro 20 is simultaneously measuring the missile attitude with respect to an arbitrary reference line, generating the measured angle $\theta$. The gyro measured value of $\theta$ and seeker measured value of $\lambda$ are subtracted at summing point 22 to form a measurement of $\xi$. The angle $\theta$ is also processed through a lag network 24, generating a function of $\theta$, $\theta'$. The function $\xi - \theta'$ is combined in a summing point 26 and processed through a shaping network 28, forming the control function $\delta$, which is the directional command to missile 12. Missile 12 responds to the directional command to reduce the angle $\lambda$ to 0, thus effecting an intercept with target 14. Typically, summing points 22 and 26 may be operational amplifiers for providing the difference signal.

Figure 3:
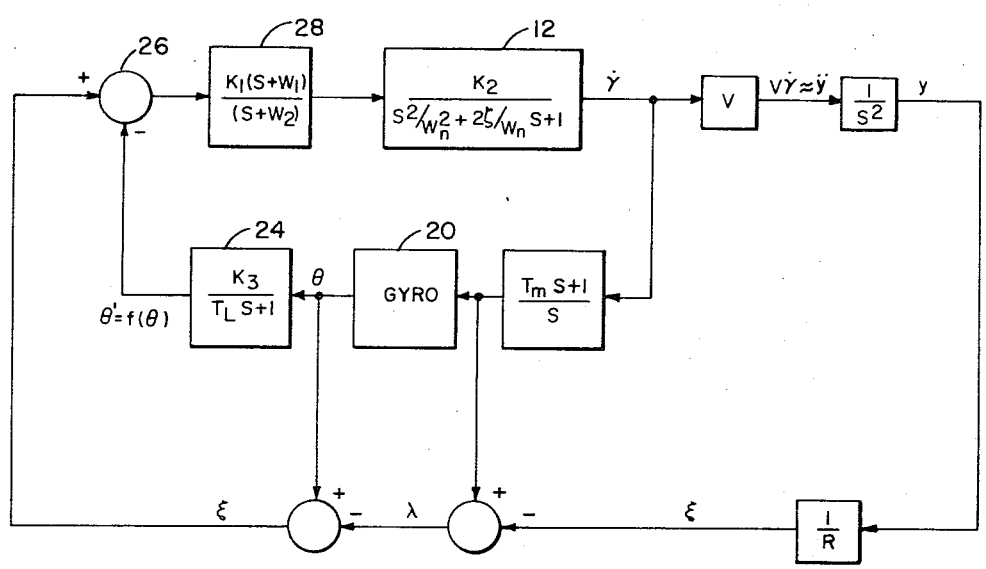
FIG. 3 is a mathematical model of the dynamic lead guidance system of FIG. 2.

A mathematical reduction of FIG. 2 is shown in FIG. 3. The variable term $s$ represents the Laplace operator. The missile transfer functions shown in the blocks are conventional. The lag network 14 has a single time constant provided by a resistor-capacitor network. Shaping network 28 is also a simple lead-lag network realizable by a resistor-capacitor combination. Lag network 24 and lead-lag network 26 are known in the art and are of the general type of networks as shown on pages 158–160 of "Feedback Control System Analysis and Synthesis" by D'Azzo and Houpis, published by McGraw-Hill Book Company in 1966.

In lag network 24, $T_L$ represents the time constant of` the network, which is selected to be as large as possible and maintain stability within the system pass band. Optimum adjustments of the gain $K_1$ and pass band of network 28 and the magnitude of $T_L$ allows the system dynamic gain to be greater than unity within a desired region, and only in this region. These quantities can be tailored for any specific missile. In lag network 24 the static gain can be increased if the gain $K_3$ is made less than one; although, this generally causes lower system performance in the presence of noise over that obtainable with lower values for $K_3$.

Dynamic lead guidance requires two basic measurement devices, the body fixed seeker 10 and the gyro 20. The signals resulting from these measurement devices are combined and shaped through the lead and lag networks to force the missile turning rate to be proportional to the line-of-sight rate. This gain is a function of frequency, unlike proportional navigation.

The accuracy of the homing device depends on the quality of the seeker used. For the more expensive or elaborate seeker, the system has a large linear region near null and follows in analog fashion the larger values of $\lambda$, transmitting the appropriate correction command to the missile. For a less accurate seeker, only a small linear region exists near null. Hence, for large errors a "bang-bang" mode of operation is required, while for small errors the system would again follow the analog or gradual approach to null.

Although a particular embodiment and form of this invention has been illustrated, it is obvious to those skilled in the art that modifications may be made without departing from the scope and spirit of the foregoing disclosure. Therefore, it is understood that the invention is limited only by the claims appended hereto.

We claim:
1. A homing navigation system for providing a missile-target error signal to generate missile directional commands, comprising: a missile housing, detector means within said missile for measuring the angular difference between the line-of-sight to a target and the missile longitudinal axis, a gyro within said missile for measuring the attitude of said missile, a first summing means responsive to said detector means and said gyro for providing a difference signal output, shaping means responsive to said summing means output to provide direction correctional signals to said missile for maintaining missile trajectory toward said target, a lag network responsive to the output of said gyro for providing a delayed output signal that is a function of said gyro output, and a second summing means, the outputs of said first summing means and said lag network being coupled to said second summing means for providing a differential output to said shaping means for providing said missile correctional signals.

2. A homing navigation system as set forth in claim 1 wherein said shaping means is a lead-lag network for maintaining the missile turning rate proportional to the missile-target line-of-sight.

References Cited

UNITED STATES PATENTS 3,064,924  11/1962  Fairbanks _____ 244—3.16
2,823,612  2/1958  Cox et al. _____ 244—3.16

BENJAMIN A. BORCHELT, Primary Examiner

T. H. WEBB, Assistant Examiner

U.S. Cl. X.R.

114—23